United States Patent [19]

Salensky et al.

[11] 4,417,008
[45] Nov. 22, 1983

[54] IMPROVED COLOR PIGMENT FOR SOLVENT-BASE PAINT FORMULATIONS

[75] Inventors: George A. Salensky, Whitehouse Station, N.J.; Kuldip S. Chopra, Grand Island; Nicholas J. Pappas, Somers, both of N.Y.

[73] Assignee: Elkem Metals Company, Pittsburgh, Pa.

[21] Appl. No.: 381,791

[22] Filed: May 26, 1982

Related U.S. Application Data

[63] Continuation-in-part of Ser. No. 279,097, Jun. 30, 1981, abandoned.

[51] Int. Cl.$^3$ .................. C08K 3/22; C09D 3/58; C09D 5/08
[52] U.S. Cl. .................. 523/442; 106/14.34; 106/14.39; 523/459; 524/356; 524/361; 524/379; 524/431
[58] Field of Search .......... 106/14.34, 14.39; 523/442, 459; 524/356, 361, 379, 431; 75/80

[56] References Cited
U.S. PATENT DOCUMENTS 3,078,992  2/1963  Shapiro et al. ............... 206/84
3,305,352  2/1967  Day ............................. 75/80
3,616,200  10/1971 Reibach ..................... 161/225 R
3,795,654  3/1974  Kirkpatrick .................. 524/431
3,839,076  10/1974 Miller ......................... 117/93.31
3,975,322  8/1976  Reinshagen et al. .......... 106/14
4,206,100  6/1980  Kyo et al. .................... 524/431

FOREIGN PATENT DOCUMENTS 50-32230  7/1975  Japan ........................ 106/14.34
1422491   1/1976  United Kingdom.

OTHER PUBLICATIONS

Merck Index, 9th Edition, "Manganese Dioxide & Manganese Oxide", 1976, p. 744.
Chemical Abstracts, vol. 91, Apr. 25, 1979, p. 65, Abstract No. 212,688J, Miller et al., "Primer Composition for Coating Substrates".

Primary Examiner—Ronald W. Griffin
Attorney, Agent, or Firm—Eyre, Mann, Lucas & Just

[57] ABSTRACT

Manganomanganic oxide fume or a material containing manganomanganic oxide fume as its principle ingredient is used as a color pigment in the formulation of solvent-base paints.

6 Claims, No Drawings

IMPROVED COLOR PIGMENT FOR SOLVENT-BASE PAINT FORMULATIONS

This patent application is a continuation-in-part of application Ser. No. 279,097 filed June 30, 1981 and now abandoned.

The present invention relates generally to solvent-base paints. More specifically, the invention relates to solvent-base paints containing an improved color pigment which substantially improves the corrosion resistant properties of these paints.

Conventional solvent-base paint formulations are prepared by mixing one or more color pigments together with a solvents resin binder and other known ingredients such as dispersants, stabilizers, thickeners, etc.. An essential requirement of any pigment is first that it must produce a distinctive and pleasant color when added to paint formulations either alone or together with other pigments. Additionally, the pigment must be stable so as to retain its color for a prolonged period of time. Another important requirement is that the pigment should have a very finely-divided particle size generally less than about ten microns, for example. The fine particles enhance the ability of the pigment to be easily dispersed throughout the paint mixture during processing and further assure that the paint can be evenly distributed in a thin layer upon application to a surface without any streaks or other imperfections. This latter requirement is most significant of course in those instances where the paint is to be applied by conventional brush and roller techniques.

It is therefore an important object of the present invention to provide an improved color pigment for use in solvent-base paints. Another more specific object of the present invention is to provide an improved solvent-base paint having good corrosion resistant properties.

The foregoing and other related objects and advantages of the present invention are achieved by an improved color pigment for use in solvent-base paints which comprises manganomanganic oxide ($Mn_3O_4$) fume or a material containing manganomanganic oxide fume as its principle ingredient. The $Mn_3O_4$ oxide fume pigment may be employed in the paint formulation together with a resin binder, solvent and other ingredients such as pigment extenders, suspension agents, etc.. Typically, the $Mn_3O_4$ fume pigment may comprise from about 20 to 35 percent by weight of the total solvent-base paint composition.

The present invention is based upon the discovery that manganomanganic oxide fume or a material containing predominantly manganomanganic oxide fume in a finely-divided or a comminuted state is an ideal color pigment for use in formulating a variety of solvent-base paints. In particular, the $Mn_3O_4$ fume color pigment is especially useful in those applications where conventional iron oxide pigments have heretofore been employed in the preparation of solvent-base paints. It has been found, for example, that finely-divided manganomanganic oxide fume when used as a color pigment exhibits a deep reddish-brown color which is similar to but yet quite readily distinguishable from the brown color pigmentation produced by a variety of synthetic iron oxide pigments, e.g., yellow, tan or red iron oxide pigments. The $Mn_3O_4$ fume color pigments also can be produced in a wide range of particle sizes which approach the particle size of conventional iorn oxide pigments of the prior art. As indicated, it is desirable to employ a color pigment having a very finely-divided particle size for several reasons, i.e., to enable the pigment to be uniformly distributed throughout the entire paint composition. Generally, the manganese oxide fume pigment should have a particle size such that about 98% of the particles are less than ten microns.

It has also been found in accordance with the present invention that solvent-base paints employing a manganese oxide fume color pigment exhibit excellent corrosion resistant properties. When tested under similar conditions, these paints exhibit a corrosion resistance which is at least equal to solvent-base paints using conventional iron oxide pigments.

As indicated, the color pigment used in the practice of the present invention is composed of manganomanganic oxide fume or may be a composition or material containing predominantly manganomanganic oxide fume, i.e., greater than about 60% by weight.

The $Mn_3O_4$ fume of the present invention is most conveniently prepared by passing a stream of oxygen through or across the surface of a molten bath of ferro-manganese. Conventional ferro-manganese produced in a blast furnace or in an electro-metallurgical furnace and the like at high temperatures of about 1200° C. or more may contain up to 6 or more percent of carbon. The carbon content is usually reduced, as for example, to about 1.5% by blowing oxygen or a mixture of oxygen and air through or against the surface of a bath of molten ferro-manganese. This is done in a separate vessel that contains a molten ferro-manganese bath freshly tapped from the electric furnace and at a temperature of about 1000° C. or more and preferably at about 1300° C. or more.

One procedure for reducing the carbon content of molten ferro-manganese is described in United States Pat. No. 3,305,352 issued Feb. 21, 1967, the description of which is incorporated by reference herein. In this preferred procedure for producing the manganomanganic oxide fume of the present invention, ferro-manganese is tapped from the electric furnace in which it is produced into a treating vessel such as a ladle or furnace at a temperature of about 1300° C. or more. Any slag is preferably skimmed off and then oxygen is top blown against the surface of the molten ferro-manganese bath by any convenient means such as one or more conventional oxygen blowing lances held about an inch above the surface to direct one or more streams of oxygen at a pressure of about 110 to about 150 p.s.i. to impinge against the surface of the bath. The flow of oxygen is about 4 to about 5 pounds per minute for a 500 pound molten bath in a ladle about 30 inches high and 20 inches inside diameter. The foregoing procedure may be sealed up as desired. The off-gas thereby produced contains very finely divided particles of manganomanganic oxide fume of spherical configuration which are easily recovered from the off-gas by conventional recovery apparatus.

If desired, the manganomanganic oxide fume of the present invention may be produced as a by-product of the specific procedure described in U.S. Pat. No. 3,305,352 for reducing the carbon content of the ferro-manganese bath. In such case, the ferro-manganese bath will be at a temperature of about 1250° C. and oxygen will be top blown at a rate sufficient to heat the bath to a temperature of 1700° C. before the carbon content of the molten metal has been reduced to 1.5%. Oxygen blowing will continue until the bath temperature reaches about 1750° C. as described in the patent. The manganomanganic oxide fume is recovered from the off-gas in conventional manner.

The terms $Mn_3O_4$ fume and manganomanganic oxide fume used in the specification and claims herein mean the finely divided spherical particles of fume recovered from the oxygen blowing of molten ferro-manganese as described above.

The data given below outlines some typical characteristics of the manganomanganic oxide fume produced as specified hereinabove for carrying out the present invention.

Chemical Formula:

Essentially $Mn_3O_4$. Typically, 96% to 98% by weight manganomanganic oxide, the balance being a mixture which includes calcium oxide, magnesium oxide, potassium oxide and silica with less than about 1% by weight of free manganese metal.

Chemical Analysis (typical wt%):
65.27Mn; 2.03Fe; 0.029Al; 0.28Si; 0.17C; 0.040P; 0.045As; 0.46Ca; 1.43Mg; 0.072K; 0.023Cr; and 0.002Pb.

Bulk Density: 45–90 lbs./ft$^3$

Moisture: 0.22% (1 hour at 107° C.)

Particle Size: 98% below about 10 microns. (99% will pass through a 325 mesh Tyler screen)

pH: 9–13 (50% $Mn_3O_4$ in distilled $H_2O$)

Shape: Spherical

Specific Gravity: 4.6 to 4.75 grams/cc

Thermal Stability: No effect up to 600° C.

Present day coating technology stresses the use of color pigments having a very fine particle size in order to enhance colorant efficiency (hiding power), suspension properties and uniform distribution of the pigment throughout the paint formulation. It has been found that when used as a color pigment in accordance with the present invention, the $Mn_3O_4$ fume should have a particle size such that about 98% of the particles are less than 10 microns. Typically, $Mn_3O_4$ fume as described above may contain about 1.0 to 2.0% particles of a size greater than about 10 microns. Accordingly, it may be desirable or even necessary in some cases to eliminate these large diameter particles from the $Mn_3O_4$ fume. This may be done for example by conventional classification techniques or by impact methods such as ball milling. Manganomanganic oxide fume which has been classified or milled to a particle size wherein about 98% of the particles are less than 10 microns can br readily dispersed in the paint formulation with medium shear equipment such as by use of a Cowles Dissolver. Paint formulations containing $Mn_3O_4$ fume in this particle size range can generally be applied to the surface to be treated without any evidence of streaking or other imperfections.

Typical solvent-base paint formulations containing a $Mn_3O_4$ fume color pigment in accordance with the present invention are represented by the following:

| | Ingredients | Amount (% by wt.) |
|---|---|---|
| A. | Resin Binder | 10–30 |
| B. | $Mn_3O_4$ pigment fume | 20–35 |
| C. | Other pigments including pigment extenders, fillers, etc. | 2–25 |
| D. | Pigment suspension agent | 0–1.5 |
| E. | Solvent | 30–90 |

The solvent-base paint formulations employing a $Mn_3O_4$ color pigment fume in accordance with the present invention can be made by conventional methods that are well known in the prior art. For example, the paint formulations can be prepared by mixing the resin binder together with the $Mn_3O_4$ fume, other pgiments and pigment suspension agents acid solvent to the mixture. Medium shear dispersion equipment can be used for this purpose, such as a Cowles Dissolver. This equipment consists of a vertical driven shaft having a saw tooth impeller at its lower end. When rotated, the impeller will impart a high velocity to the mixture of fluid and pigment resulting in a shear condition. Other equipment such as a ball mill may also be employed with equal success as will readily occur to those skilled in the art.

The binder used in the paint formulation of the present invention may be any one of a number of well known resins conventionally employed for this purpose in the paint industry. Generally, the binder will be chosen from one of four groups: (1) reactive binders such as epoxy resins derived from bisphenol A and epichlorhydrin which are hardened with polyamines such as polyaminoamides, diethylene triamine, triethylene tetramine or coal tar amines; (2) and air drying binders such as those derived by reaction from diglycidyl ether of bisphenol A and vegetable oil fatty acids; (3) solvent soluble binders which harden by solvent evaporation such as polyhydroxy ether of bisphenol A derived from bisphenol A and epichlorhydrin (Phenoxy PKHH); and (4) binders conventionally employed in moisture curable systems such as alkyl silicate prepared by hydrolysis or polymerization of tetraethyl silicate, alcohol and glycol. Typical polyaminoamide hardened epoxy resins that can be used as the binder are those sold under the trademark Epon 1001-CX75 (Shell Chemical) which is a condensation product of epichlorhydrin and bisphenol A. This resin has an epoxide equivalent weight of 450–550 grams per gram equivalent of epoxide (ASTM D-1652) which is 75% solids in methylisobutyl ketone/xylene in a ratio 65/35. Suitable hardeners that may be employed with this resin are those sold under the trademark Versamid 415 (General Mills). These hardeners are reactive polyaminoamide resins based on polymerized vegetable fatty acids. They have an amine value of 230–246 mg. of KOH equivalent to basic nitrogen content in one gram sample and a viscosity of about 31–38 poises at the 75° C. Typical epoxy ester resin binders for use in the air drying by oxidation systems are those sold under the trademark Epotuf 38–403 (Reichhold Chemical). Polymerized ethyl silicate is a good example of a suitable binder for use in the moisture curable binder system. Useful solvent soluble binders which dry by solvent evaporation are polyhydroxy ethers derived from bisphenol A and epichlorhydrin known as "Phenoxy" resins sold by Union Carbide Corp.

Other suitable solvent soluble binders that can be employed in the paint formulation invention include, for example, high molecular weight epoxy resins, alkyd resins, polyesters, chlorinated rubber, and vinyl chloride-vinyl acetate copolymers with or without hydroxyl or carboxyl functionality.

The manganomanganic oxide pigment fume can be used in the paint formulation of the present invention either alone or together with other conventional color pigments and pigment extenders, fillers, corrosion inhibitors, etc. For example, $Mn_3O_4$ pigment fume can be employed together with conventional $TiO_2$ pigments as well as various types of iron oxide pigments, e.g., red or yellow iron oxides. Various pigment extenders can also be used such as talc, clays (hydrous aluminum silicate), diatomaceous silica and silica. Talc sold under the trademark Nytal 300 (RT Vanderbilt) is one exampl of a good pigment extender for use in the paint formulation. In addition, other corrosion inhibitive pigments such as zinc chromate, for example, may also be employed in the paint formulation.

A pigment suspension agent may also be employed. Typical suspension agents for use in the paint formulation are those sold under the trademark Bentone 27 (NL Industries) which is an organic derivative of hydrous magnesium aluminum silicate, Kelecin F (Spencer Kellog) i.e. lecithin, and Nuosperse (Tenneco Chemical Co.).

The solvent used in the paint formulation of the present invention may be any one of a variety of solvents and solvent mixtures conventionally employed in solvent base paints. Suitable solvents and solvent mixtures that can be used include, for example, ketones such as methylisobutylketone (MIBK), aromatics and mixtures of ketones and aromatics. Typical aromatic solvents that can be used are xylene and toluene. Another common aromatic solvent that can be used is SC-100 (Exxon) which is based on diethyl benzene. Other commercial solvents that can be employed include Cellosolve (ethylene glycol monoethylether) and Cellosolve Acetate (ethylene glycol monoethyletheracetate), both trademarks of Union Carbide Corp. Cellosolve Acetate is recommended particularly for use as a solvent in the systems employing phenoxy resins as hereinabove described. Also in the case where the solvent soluble binder is an alkyd resin, petroleum distillate mineral spirits are generally used. Similarly, where the binder is a chlorinated rubber, both xylene toluene are good solvents. Other suitable solvents for these binders include ketones and/or mixtures of ketones. Another solvent that may also be used in the paint formulation is a blend which contains one third each of xylene, MIBK and Cellosolve.

The paint formulations of the present invention may also include various other ingredients that are conventionally employed in solvent base paints of the prior art. For example, various additives may be employed to improve the film properties of the applied coating. Commercially available materials that may be used for this purpose include Beetle 216-8 (American Cyanamid) which is a urea resin—60% solution with Butanol/xylene; and ethyl alcohol which is recommended for use with the suspension agent Bentone 27. A viscosity controlling agent such as diatomaceous earth may also be employed in the paint formulation, i.e. Celite, a trademark of Johns Manville. Other ingredients that may be employed include anti-gasing or water scavenging agents such as those sold under the trademark Syloid ZN-1 (W. R. Grace) which is a silica gel. Anti-skinning agents may also be used such as Ex-Kin No 2 (Tenneco Chemical Company).

A series of tests were conducted in order to demonstrate the corrosion inhibitive properties of the $Mn_3O_4$ fume pigment. This test was performed according to procedures outlined by G. A. Salensky in "Corrosion Inhibitor Test Method" presented at NACE International Conference On Corrosion Control, at Lehigh University on August 11, 1980. Basically, these test procedures simulate the environment of a coating under salt spray attack and employ a liquid model compound as a matrix for the water insoluble corrosion inhibitor under study. In this particular instance, the model liquid was 5 ml of phenyl ether which was placed at the bottom of a test tube along with 1 ml of 3% salt solution. A sample specimen made of cold rolled steel measuring approximately 40×12×1 mm was weighed and then inserted into the solution at the bottom of the test tube. The tube was then oscillated at about 240 cycles per minute while maintaining the solution temperature at about 40° C. The sample was then removed after about 24 hours, cathodically cleaned to remove the corrosion product, weighed and its weight loss was recorded. The procedure was repeated again using the same model liquid but with the addition of 5% by weight $Mn_3O_4$ fume pigment and in a separate test 5% by weight of zinc chromate. The degree of corrosion was calculated by dividing the percent weight loss with the inhibitive pigment by the percent weight loss without the inhibitor. Subtracting this calculated value from the "1" gives the degree of protection or corrosion inhibitor efficiency which can be rated as follows: 1.0—complete protection; 0.9—good protection; 0.0—same as with no inhibitor; and —0.1—accelerates corrosion. It was found that the corrosion inhibitor efficency for the $Mn_3O_4$ fume pigment derived in the above test was 0.94 while the inhibitor efficiency for the zinc chromate was 0.99. It is, of course, well known that zinc chromate is an excellent corrosion inhibitive material. It was further found that the control solution which did not contain either of the two inhibitors had a corrosion inhibitor efficiency of 0.00.

Another series of tests were conducted to demonstrate the corrosion inhibitive properties of the $Mn_3O_4$ fume material. In these tests, a number of cotton patches (gun patches) measuring approximately one inch round and having a thickness of about 5-10 mils were thoroughly wetted with either distilled water or 3% by weight salt solution containing 10% pigment and then placed against one side of a bare steel sample. The cotton patches soaked with distilled water were removed after 72 hours while the cotton patches soaked with 3% salt solution were removed after 48 hours. The results of this test are reported in Table I below.

TABLE I

| Corrosion Resistance of $Mn_3O_4$ Fume In Distilled Water and 3% Salt Solution | | |
|---|---|---|
| Pigment | Distilled Water (72 hrs.) | 3% Salt Solution (48 hrs.) |
| $Mn_3O_4$ Fume | Good - no rust | Moderate rust |
| Zinc Chromate (Y - 539D - E. I. DuPont) | Medium* | Moderate + rust* |

*Peripheral rust

In above test, 1 gram of pigment was mixed with 9 grams of distilled water or salt solution.

The following examples will further illustrate the practice of the present invention:

EXAMPLE 1

A solvent-base paint formulation was prepared using a conventional $TiO_2$ color pigment. The formulation was prepared by blending together 168.3 grams of an epoxy binder, i.e., Epon 1001-CX 75 (Shell Chemical); 236.2 grams of $TiO_2$ pigment; 42.5 grams of talc, i.e., Nytal 300 (R. T. Vanderbilt); 4.8 grams of Bentone 27

(N L Industries), and 0.7 grams of Kelecin F (Spencer Kellog), lecithin, both pigment suspension agents; 39.8 grams of xylene; 9.3 grams of ethylene glycol monoethyl ether, i.e. Cellosolve (Union Carbide Corp. ); 19.9 grams of aromatic solvent, i.e., SC-100 (Exxon); 15.1 grams MIBK (methylisobutylketone), 4.5 grams urea resin, i.e., Beetle 216.8 (American Cyanamid); and 1.4 grams of isopropyl alcohol. This mixture (Component A) was then thoroughly mixed together with a second component (Component B) prepared by blending together 169.6 grams of polyamide epoxy hardener, i.e., Versamid 415 (General Mills); 136.3 grams of talc, i.e., Nytal 300 (R. T. Vanderbilt); and 55.3 grams of ethylene glycol monoethylether acetate, i.e., Cellosolve Acetate (Union Caride Corp.). Both Components A and B were mixed in a volume ratio of 2 to 1 respectively.

The paint formulation so prepared was sprayed onto the surface of a number of test panels made of bare cold rolled steel (SAE 1010) measuring approximately 4×8 inches. The thickness of the sprayed coating was about 2 mils. The coated panels were then scribed across a portion of their surface and subjected to a 5% salt fog environment according to ASTM B 117. The performance of each coating was also determined by observing the amount of rust that developed on the exposed bare metal.

EXAMPLE 2

A solvent-base paint formulation was prepared using the same ingredients as those employed in the paint formulation of Example 1, except that in this case the 236.2 grams $TiO_2$ were replaced with an equal amount of red iron oxide pigment. The paint formulation was sprayed onto a number of steel test panels in the same manner as described in Example 1 and the test panels were then subjected to the same corrosion test.

EXAMPLE 3

A solvent-base paint formulation was prepared using the same ingredients as those employed in the paint formulations of Examples 1 and 2, except that in this case the 236.2 grams of $TiO_2$ or red iron oxide were replaced with 193.7 grams of zinc chromate pigment. The paint formulation was sprayed onto a number of steel test panels in the same manner described in the Example 1 and the panels were then subjected to the same corrosion test.

EXAMPLE 4

A solvent-base paint formulation was prepared using the same ingredients as those employed in the paint formulation of Examples 1 and 2, except that in this case the 236.2 grams of $TiO_2$ or red iron oxide were replaced with an equal amount of $Mn_3O_4$ fume. The paint formulation was again spryed onto a number of steel test panels in the same manner as described in the Example 1 and the test panels were subjected to the same corrosion test.

EXAMPLE 5

A solvent-base paint formulation was prepared using the same ingredients as those employed in the paint formulation of Example 4, except that in this case a greater quantity, e.g., 276.2 grams, of $Mn_3O_4$ fume were employed. The paint formulation was again sprayed onto a number of steel test panels in the same manner as described in the Example 1 and the test panels were subjected to the same corrosion test.

The results of the corrosion tests using the various paint formulations described in Examples 1-6 are reported in Table II below. The size and number of blisters that formed on the coating were rate according to ASTM Std. D 714-56 as follows: The size of the blisters were rated from 2 to 8, the larger number representing the smallest size blister, while the smaller of blisters were rated as "few", "medium", "medium dense" or "dense".

EXAMPLE 6

A solvent-base paint formulation was prepared using the same ingredients as those employed in the paint formulation in Example 4, except that in this case a lesser quantity e.g., 206.0 grams, of the $Mn_3O_4$ fume, were employed along with 30.2 grams of zinc chromate. The paint formulation was again sprayed onto a number of steel test panels in the same manner as described in the Example 1 and the test panels were subjected to the same corrosion test.

TABLE II

| Example No. | Pigment | Coating Thickness (Mils) | Blistering |
|---|---|---|---|
| 1 | Titanium Dioxide | 1.7 | 2 - few |
| 1 | Titanium Dioxide | 2.5 | 2 - few |
| 2 | Red Iron Oxide | 1.6 | 4 - medium |
| 2 | Red Iron Oxide | 2.4 | 4 - medium |
| 3 | Zinc Chromate | 1.6 | 6 - medium dense |
| 3 | Zinc Chromate | 2.7 | 6 - medium dense |
| 4 | $Mn_3O_4$ Fume | 1.5 | 4 - medium |
| 4 | $Mn_3O_4$ Fume | 2.2 | 4 - medium |
| 5 | $Mn_3O_4$ Fume (Increased Quantity) | 1.5 | 4 - medium dense |
| 5 | $Mn_3O_4$ Fume (Increased Quantity) | 2.4 | 4 - medium |
| 6 | $Mn_3O_4$ Fume plus Zinc Chromate | 1.4 | 2 - few |
| 6 | $Mn_3O_4$ Fume plus Zinc Chromate | 2.2 | 4 - few |

CORROSION RESISTANCE OF $Mn_3O_4$ FUME COATINGS BASED ON EPOXY-POLYAMIDE SYSTEM

It will be seen from the results of the corrosion test reported in Table II that solvent-base paint formulations based on the epoxy-polyamide system containing $Mn_3O_4$ fume pigments in accordance with the present invention exhibit good to excellent corrosion resistance when applied to the test panels. In particular, these paint formulations containing $Mn_3O_4$ fume when applied to test panels as a relatively thick coating (i.e. about 2.5 mils) were equal or more resistant to corrosion than paint formulations containing conventional pigments such as titanium dioxide and red iron oxide. Comparable results were also obtained when the paint formulations were applied in the form of thin coatings (i.e. about 1.5 mils). It will be further observed from the results of Table II that the corrosion resistant properties of paint formulations prepared in accordance with the present invention do not appear to be more enhanced by increases in the amount of $Mn_3O_4$ fume employed.

EXAMPLE 7

A solvent-base paint formulation were prepared by blending together 73.8 grams of epoxy ester resin, i.e., Epotuf 38-403 (Reichhold Chemicals); 137.3 grams of zinc chromate pigment; 24.4 grams of talc, i.e., Nytal 300 (R. T. Vanderbilt); 1.9 grams of a pigment suspension agent, i.e., Nuosperse (Tenneco Chemicals); and 70.9 grams of aromatic solvent, i.e., xylene. This mixture was then fed through a Myers Mixer to a fineness of 6 NS (Hegman) and the following ingredients were added: 188.1 grams of epoxy ester, i.e., Epotuf 38-403; 2.2 grams of 24% lead napthenate (Tenneco Chemicals); 0.8 grams of 6% cobalt napthenate (Tenneco Chemicals); and 0.5 grams of an anti-skinning agent, i.e., Ex-Kin No. 2 (Tenneco Chemicals). The paint formulation so prepared was then sprayed onto a number of test panels made of bare cold rolled steel (SAE 1010) measuring approximately 4×8 inches to a thickness of about 1.5 mils and then allowed to dry in room air for about one week. The test panels were scribed on one side and then subjected to a 5% salt fog environment for about 100 hours. The panels were then observed for any signs of corrosion, i.e., rust or blisters.

EXAMPLE 8

A solvent-base paint formulation was prepared using the same ingredients as those employed in the paint formulation described in Example 7, except that in this case the 137.3 grams of zinc chromate were replaced with 161.7 grams of $TiO_2$ pigment. The paint formulation so prepared was then sprayed onto a number of test panels made of cold rolled steel to a thickness of about 1.5 mils and allowed to dry in room air for about one week. The coated panels were scribed in the same manner as described in Example 7 and then subjected to the samel salt fog environment for about 100 hours. The panels were then observed for any signs of corrosion.

EXAMPLE 9

A solvent-base paint formulation was prepared using the same ingredients as those employed in the paint formulation described in Example 8, except that in this case the 161.7 grams $TiO_2$ were replaced with an equal amount of $Mn_3O_4$ fume pigment. The paint formulation so prepared was sprayed onto a number of test panels made of bare cold rolled steel to the same thickness, i.e., 1.5 mils, and then allowed to dry in room air for about one week. The coated panels were scribed on one side and then subjected to the same salt for environment for about 100 hours. The panels were again observed for any signs of corrosion.

EXAMPLE 10

A solvent-base paint formulation was prepared using the same ingredients as those employed in the paint formulation described in Example 9, except that in this case the 161.7 grams of $Mn_3O_4$ fume were replaced with an equal amount of red iron oxide pigment. The paint formulation so prepared was then sprayed onto a number of test panels made of cold rolled steel to a thickness of about 1.5 and allowed to dry in room air also for a period of about one week. The coated panels were scribed on one side and then subjected to the same salt fog environment for about 100 hours. The panels were again observed for any signs of corrosion.

EXAMPLE 11

A solvent-base paint formulation was prepared by blending together 73.8 grams of epoxy ester resin, i.e., Epotuf 38-403 (Reichhold Chemicals); 241.7 grams of $Mn_3O_4$ fume pigment; and 1.9 grams of pigment suspension agent, e.g., Nuosperse (Tenneco Chemicals). The blended ingredients were mixed thoroughly for about 30 minutes at 200 rpm to a fineness of 5-6 NS (Hegman) and were then transferred to a second mixture containing 148.1 grams of epoxy ester resin i.e. Epotuf 38-403 (Reichhold Chemicals); 2.2 grams of 24% lead naphthenate; 0.8 grams of 6% cobalt naphthenate; and 0.5 grams of anti-skinning agent i.e. Ex-Kin No. 2 (Tenneco Chemicals). This paint formulation containing an increased amount $Mn_3O_4$ fume was also sprayed onto a number of test panels made of cold rolled steel to a thickness of about 1.5 mils. The panels were allowed to dry in room air for about one week. The coated panels were scribed on one side in a manner similar to those in the previous examples and were then subjected to the same salt fog environment for about 100 hours. The panels were again observed for any signs of corrosion.

The results of the salt fog corrosion tests described in Examples 6–11 are reported in Table III below. Corrosion resistance of the coatings was rated according to the same ASTM Std D 714-56.

TABLE III

CORROSION RESISTANCE OF $Mn_3O_4$ FUME COATINGS BASED ON EPOXY-ESTER SYSTEM

| Example No. | Pigment | Coating Thickness (Mils) | Blistering |
|---|---|---|---|
| 7 | Zinc Chromate | 1.4 | 8 - dense* |
| 8 | Titanium Dioxide | 1.5 | 2 - few |
| 9 | $Mn_3O_4$ Fume | 1.5 | None |
| 10 | Red Iron Oxide | | 8 - dense* |
| 11 | $Mn_3O_4$ Fume (Increased Quantity) | | None |

*Blisters clustered near x - scribe on panel.

It will be seen from the Table III above that paint formulations based on the epoxy-ester system and containing $Mn_3O_4$ fume pigment exhibited a corrosion resistance which was superior to paint formulations containing conventional red iron oxide, $TiO_2$ and zinc chromate pigments.

EXAMPLE 12

A solvent-base paint formulation was prepared by blending together 120.0 grams of Phenoxy PKHH (Union Carbide); 30 grams Phenolic BKR-2620 (Union Carbide); 1.1 grams suspending agent, i.e., MPA-60 (N L Inidustries); 1.1 grams suspending agent, i.e., Silanox 101 (Cabot Corp.) which is a silane treated pyrogenic silica; and 179 grams of zinc dust L-15 (Federated Metals). Both the Phenoxy PKHH and Phenolic BKR-2620 were dissolved in Cellosolve Acetate (Union Carbide)—21% solids. The mixture was thoroughly blending in a Cowles Dissolver for a period of time sufficient to insure that all of the ingredients were uniformly dispersed throughout the paint formulation.

The paint formulation so prepared was then applied to a number of test panels made from bare cold rolled steel and measuring approximately 4×6 inches. The applied coating was baked at a temperature of about 350° F. for about 15 minutes and the film thickness of the coatings were then measured. The test panels were subjected to a salt spray corrosion test according to standard procedures and the panels were rated in accordance with methods outlined in ASTM (D714-56,D610-68).

EXAMPLE 13

A solvent-base paint formulation was prepared using the same ingredients as those employed in the paint formulation described in Example 12, except that in this case the 179 grams of zinc dust were replaced with 118 grams of $Mn_3O_4$ fume pigment. The paint formulation prepared in this example had approximately the same volume percent solids as that of the paint formulation in the previous Example 12, i.e., 48% by volume solids. The paint formulation was applied to test panels made of cold rolled steel in the same manner described in Example 12. The test panels were subjected to the same salt spray corrosion test and were rated according to the same ASTM method.

EXAMPLE 14

A solvent-base paint formulation was prepared using the same ingredients as those employed in the paint formulation in Example 13, except that in this instance an increased amount, of $Mn_3O_4$ fume pigment i.e., 147.5 grams was employed. The paint formulation had a solids content of about 53% by volume which was slightly higher than that of the paint formulations in the previous Examples 12 and 13. The paint formulation was applied to test panels made of cold rolled steel in the same manner as previously described. The panels were then subjected to the same salt spray corrosion test and were rated according to the same ASTM method.

The results of the salt spray corrosion test are given in Table III below.

TABLE IV

Corrosion Resistance of $Mn_3O_4$ Fume Coatings Based on Phenoxy Resin System

| Example | Test Period (Hrs.) | Corrosion | Blisters |
|---|---|---|---|
| 12 | 100 | 8 | 8M |
| 12 | 260 | 7 | 8M |
| 12 | 360 | 7 | 8M |
| 13 | 100 | 8 | 6-8MD |
| 13 | 260 | 8 | 6-8MD |
| 13 | 360 | 5 | 6-8MD |
| 14 | 100 | 9 | |
| 14 | 260 | 4 | 6-8MD |
| 14 | 360 | 4 | 6-8MD |

It will be seen from the results of Table III that the paint formulations based on the phenoxy resin systems containing $Mn_3O_4$ fume pigment exhibited a corrosion resistance which was about equal to the corrosion resistance of the paint formulation containing zinc dust up to about 260 hours of test. It will be understood of course that paint formulations containing the zinc dust as a corrosion inhibitive pigment are very well known for their high performance under salt spray conditions.

EXAMPLE 15

A solvent-base formuation was prepared by blending together 120.0 grams of Phenoxy PKHH (Union Carbide); 30 grams Phenolic BKR-2620 (Union Carbide); and 118 grams of $Mn_3O_4$ fume pigment. Both the Phenoxy PKHH and Phenolic BkKR-2620 were dissolved in Cellosolve Acetate (Union Carbide Corp.)—21% solids. The mixture was thoroughly blended in a Cowles Dissolver for a period of time sufficient to insure uniform mixing of all ingredients. The paint formulation so prepared had a solids content of about 79% by weight solids (49% by volume solids) and a Brookfield viscosity of 1000 centipoises with a spindle speed of 2 rpm. Paint formulation was applied to a number of test panels made from bare cold rolled steel measuring approximately 4×6 inches. The applied coating was baked at a temperature of about 350° C. for about 15 minutes. The film thickness of the coatings was about 0.5 mils. The test panels were subjected to a salt spray corrosion test according to standard procedure and panels were rated in accordance with methods outlined in ASTM D-714-56 and D-610-68.

EXAMPLE 16

A solvent-base paint formulation was prepared using the same ingredients as those employed in the paint formulation described in Example 15, except that in this case the 118 grams of $Mn_3O_4$ fume were replaced with 31.5 grams of red iron oxide and 31.5 grams of talc. The paint formulation so prepared had a solids content of about 67% by weight solids (40% by volume solids) and a viscosity of 5000 centipoises (spindle speed 2 rpm). The paint formulation was again applied to panels made to cold rolled steel in the same manner as described in Example 15. The test panels were subjected to the same salt spray corrosion tests and were rated according to the same ASTM method.

EXAMPLE 17

A solvent-base paint formulation was prepared using the same ingredients as those employed in the paint formulation described in Example 15, except that in this case the 118 grams of $Mn_3O_4$ fume pigment was replaced with 31.5 grams of black iron oxide and 31.5 grams of talc. The paint formulation so prepared had a solids content of 67% by weight solids (40% by volume solids) and a viscosity of 7500 centipoises (spindle speed 2 rpm). The paint formulation was applied to test panels made of cold rolled steel in the same manner as described in Example 15. The thickness of the applied coating was again about 0.5 mils. The test panels were subjected to the same salt spray corrosion test and were again rated according to the same ASTM method.

The results of the salt spray corrosion test in Examples 15-17 are given in Table V below.

TABLE V

Corrosion Resistance of $Mn_3O_4$ Fume Coatings Compared to Coatings Containing Iron Oxide Pigments

| Example | Test Period (hrs) | Corrosion | Blisters |
|---|---|---|---|
| 15 | 100 | 6 | 6M |
| 15 | 245 | 4 | 6M |
| 16 | 100 | 5 | 6MD |
| 16 | 245 | 3 | 6MD |
| 17 | 100 | 5 | 6M |
| 17 | 245 | 1 | 6MD |

It will be seen from the results outlined in Table V that paint formulations based on the Phenoxy resin system containing $Mn_3O_4$ fume pigment exhibited a corrosion resistance which was superior to the corrosion resistance of paint formulations containing either red iron oxide or black iron oxide pigments. This superior performance was particularly noticeable after prolonged test periods of up to 245 hours.

What is claimed is:

1. A solvent base paint formulation comprising: from about 10 to 30% by weight of a resin binder comprising an epoxy resin compound derived from bisphenol A and epichlorhydrin which are hardened with polyamines selected from the group consisting of polyaminoamides, diethylene triamine, triethylene tetramine and coal tar amines; from about 20 to 35% by weight $Mn_3O_4$ fume pigment; from about 2 to 25% by weight of additional pigments including pigment extenders, fillers and corrosion inhibitors; from about 0 to 1.5% by weight of a pigment suspension agent; and from about 30 to 90% by weight of a solvent.

2. A solvent base paint formulation according to claim 1 wherein said solvent is selected from the group consisting of ketones, aromatic solvents and mixtures of ketones and aromatic solvents.

3. A solvent base paint formulation according to claim 1 further including a viscosity controlling agent.

4. A solvent base paint formulation according to claim 1 further including an anti-gasing or water scavenging agent.

5. A solvent base paint formulation comprising from about 10 to 30% by weight of a resin binder comprising an air drying resin compound derived by reaction from diglycidyl ether of bisphenol A and vegetable oil fatty acids; from about 20 to 35% by weight $Mn_3O_4$ fume pigment; from about 2 to 25% by weight of additional pigments including pigment extenders, fillers and corrosion inhibitors; from about 0 to 1.5% by weight of a pigment suspension agent; and from about 30 to 90% by weight of a solvent.

6. A solvent base paint formulation comprising: from about 10 to 30% by weight of a resin binder comprising a solvent soluble resin compound comprising polyhydroxy ether of bisphenol A derived from bisphenol A and epichlorohydrin; from about 20 to 35% by weight $Mn_3O_4$ fume pigment; from about 2 to 25% by weight of additional pigments including pigment extenders, fillers and corrosion inhibitors; from about 0 to 1.5% by weight of a pigment suspension agent; and from about 30 to 90% by weight of a solvent.

* * * * *

UNITED STATES PATENT AND TRADEMARK OFFICE
CERTIFICATE OF CORRECTION

PATENT NO. : 4,417,008

DATED : November 22, 1983

INVENTOR(S) : George A. Salensky; Kuldip S. Chopra; Nicholas J. Pappas

It is certified that error appears in the above-identified patent and that said Letters Patent are hereby corrected as shown below:

Column 1, line 67, change "iorn" to --iron--.

Column 3, line 47, change "br" to --be--.

Column 4, line 4, change "pgiments" to --pigments--.

Column 4, lines 21, 29 and 54, change "epichlorhydrin" to --epichlorohydrin--.

Column 5, line 5, change "exampl" to --example--.

Column 5, line 36, after "xylene" and before "toluene", insert the word --and--.

Column 8, line 4, change "rate" to --rated--.

Column 8, line 62, change "were" to --was--.

Column 9, line 41, change "for" to --fog--.

Column 10, line 27, after the word "Quantity", insert --)--.

UNITED STATES PATENT AND TRADEMARK OFFICE
CERTIFICATE OF CORRECTION

PATENT NO. : 4,417,008

DATED : November 22, 1983

INVENTOR(S) : George A. Salensky; Kuldip S. Chopra; Nicholas J. Pappas

It is certified that error appears in the above-identified patent and that said Letters Patent are hereby corrected as shown below:

Column 10, line 42, change "Inidustries" to --Industries--.

Column 11, lines 24 and 38, delete "Table III" and substitute therefor --Table IV--.

Column 11, line 49, change "formuation" to --formulation--.

Column 11, line 54, change "BkKR-2620" to --BKR-2620--.

Column 12, line 14, change "to" to --of--.

Column 12, line 60, change "epichlorhydrin" to --epichlorohydrin--.

Signed and Sealed this

Eighth Day of October 1985

[SEAL]

Attest:

Attesting Officer

DONALD J. QUIGG

Commissioner of Patents and
Trademarks—Designate